United States Patent Office 2,749,352
Patented June 5, 1956

2,749,352

VAT DYESTUFFS

Heinz Werner Schwechten, Rutger Neeff, and Josef Singer, Leverkusen-Bayerwerk, Germany, assignors to Farbenfabriken Bayer Aktiengesellschaft, Leverkusen, Germany, a corporation of Germany No Drawing. Application May 13, 1954,
Serial No. 429,684

Claims priority, application Great Britain May 29, 1953

6 Claims. (Cl. 260—307.5)

This invention comprises new dyestuffs and their production.

Red vat dyestuffs of the general Formula I

I are known from United States Patent No. 2,464,831.

According to the present invention ruby-red vat dyestuffs are obtained by introducing a chlorine atom in at least one of the β-positions of the non-amino substituted nuclei in the above formula. This displacement to the more valuable ruby-red shade is a surprising feature according to the invention since the 5.5'-dichloro and 8.8'-dichloro compounds do not show a similar displacement. The shade is considerably shifted by introducing only one atom of chlorine in for instance 6-position.

The new vat dyestuffs are distinguished from the previously known ruby-red vat dyestuffs by excellent fastness properties, especially fastness to light.

The new dyestuffs can be obtained in known manner, for instance from the substituted 1-amino-anthraquinone-2-carboxylic acids by converting the same into the corresponding N,N'-diacyl hydrazides and treating the latter with dehydrating agents to thereby form the oxdiazole ring.

The invention is further illustrated by the following examples without being restricted thereto, the parts being by weight.

Example 1

15 parts of 6-chloro-1-amino-anthraquinone-2-carboxylic acid hydrazide are dissolved in 400 parts o-dichloro benzene, and 15.5 parts of 6-chloro-1-amino-anthraquinone-2-carboxylic acid chloride are added thereto with stirring at a temperature of about 95° C. Stirring is continued until the development of hydrogen chloride has finished. The N,N'-di-(6-chloro-1-amino-anthraquinone-2-carboxylic acid)-hydrazide, crystallizing in red needles, is filtered with suction and freed from solvent in known manner.

30 parts of the above hydrazide are dissolved in 190 parts of fuming sulphuric acid containing 20 per cent of SO₃ and stirred at a temperature of 25–30° C. for three hours. By adding 35 parts of 80 per cent sulphuric acid the SO₃-content of the fuming sulphuric acid is removed and the sulphate of di-(6'-chloro-1'-amino-anthraquinonyl-2')-2.5-oxdiazole-1.3.4 is precipitated by slowly adding 36 parts of water. The slightly yellowish coloured prismatic needles are suction filtered, washed with 80 per cent sulphuric acid and recovered as usual. The dyestuff obtained dissolves in concentrated sulphuric acid to give a yellow solution and dyes cotton from a claret coloured vat in full ruby-red shades.

In an analogous way the di-(7'-chloro-1'-amino-anthraquinonyl-2')-2.5-oxdiazole-1.3.4 and a mixture of di-(6' - chloro - 1' - amino - anthraquinonyl - 2') - 2.5 - oxdiazole-1.3.4 and di(7'-chloro-1'-amino-anthraquinonyl-2')-2.5-oxdiazole-1.3.4 are obtainable. The properties of these compounds are similar to those of the above 6-chloro-derivate.

Example 2

15 parts of 6.7-dichloro-1-amino-anthraquinone-2-carboxylic acid hydrazide are dissolved in 400 parts of o-dichloro benzene and reacted with 15.5 parts of 6.7-dichloro-1-amino-anthraquinone-2-carboxylic acid chloride at a temperature of about 95° C. After the reaction the hydrazide which crystallizes in red needles is isolated in known manner and treated with fuming sulphuric acid (as described in Example 1) to bring about cyclization to di-(6'.7'-dichloro-1'-amino-anthraquinonyl-2')-2.5-oxdiazole-1.3.4.

Example 3

7.5 parts of 6-chloro-1-amino-anthraquinone-2-carboxylic acid hydrazide are dissolved in 200 parts of o-dichloro benzene at 95° C. and 6.8 parts of 1-amino-anthraquinone-2-carboxylic acid chloride are added with stirring. Stirring is continued until the development of hydrogen chloride has finished, and the N-(6-chloro-1-amino-anthraquinone-2-carboxylic acid)-N'-1-amino-anthraquinone-2-carboxylic acid)-hydrazide, crystallizing in red needles, is filtered with suction, recovered and converted into the oxdiazole as described in Example 1.

The dyestuff obtained dissolves in concentrated sulphuric acid with a yellow colouration and dyes cotton from a claret coloured vat in full bluish red shades of excellent fastness properties.

Similarly, the 7-chloro-compound, a mixture of the 6- and 7-chloro-compound and the 6.7-dichloro-compound may be obtained.

We claim:

1. As a new dyestuff, a di-(1'-amino-anthraquinonyl-2')-2,5-oxdiazole-1,3,4, having a chlorine atom substituted on at least one of the β-positions of the non-animated nucleus of the anthraquinone system.

2. The dyestuff having the formula

3. The dyestuff having the formula

4. The dyestuff having the formula

5. The dyestuff having the formula
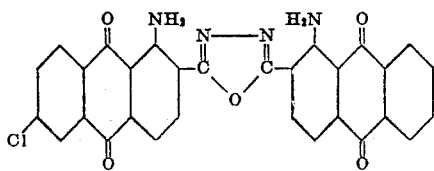
6. The dyestuff having the formula
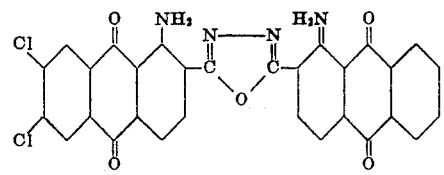
References Cited in the file of this patent
UNITED STATES PATENTS
| | | |
|---|---|---|
| 2,464,831 | Stilmar | Mar. 22, 1949 |
| 2,650,926 | Stilmar | Sept. 1, 1953 |